United States Patent
Sachdev et al.

(10) Patent No.: US 8,951,654 B2
(45) Date of Patent: Feb. 10, 2015

(54) MATERIALS AND METHODS FOR RETARDING OR PREVENTING THERMAL RUNAWAY IN BATTERIES

(75) Inventors: Anil K. Sachdev, Rochester Hills, MI (US); Mark W. Verbrugge, Troy, MI (US); Thomas C. Pederson, Rochester Hills, MI (US); William R. Rodgers, Bloomfield Township, MI (US); Hamid G. Kia, Bloomfield Hills, MI (US); Howard William Cox, Bloomfield Hills, MI (US); Paula D. Fasulo, Eastpointe, MI (US); Ingrid A. Rousseau, Clinton Township, MI (US); Tao Xie, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 13/310,012

(22) Filed: Dec. 2, 2011

(65) Prior Publication Data

US 2013/0143076 A1  Jun. 6, 2013

(51) Int. Cl.
| | |
|---|---|
| H01M 10/50 | (2006.01) |
| H01M 4/62 | (2006.01) |
| H01M 2/14 | (2006.01) |
| H01M 2/16 | (2006.01) |
| H01G 11/18 | (2013.01) |
| H01G 11/52 | (2013.01) |
| H01G 11/54 | (2013.01) |
| H01M 10/60 | (2014.01) |
| H01M 10/42 | (2006.01) |

(52) U.S. Cl.
CPC ............... *H01M 10/50* (2013.01); *H01G 11/52* (2013.01); *H01M 10/4235* (2013.01); *H01G 11/18* (2013.01); *H01M 2/16* (2013.01); *H01M 2/14* (2013.01); *H01G 11/54* (2013.01); *H01M 4/628* (2013.01)
USPC ............. 429/62; 429/129; 429/142; 429/247; 429/248; 361/502

(58) Field of Classification Search
USPC ............................. 429/62, 129, 142; 361/502
See application file for complete search history.

(56) References Cited

U.S. PATENT DOCUMENTS

| 4,075,400 A | * | 2/1978 | Fritts .............................. 429/62 |
| 5,714,277 A | * | 2/1998 | Kawakami ...................... 429/62 |

(Continued)

FOREIGN PATENT DOCUMENTS

| JP | 01161671 A | * | 6/1989 |
| JP | 09045369 A | * | 2/1997 |
| JP | 10270084 A | * | 10/1998 |

OTHER PUBLICATIONS

IPDL Machine Translation of the Detailed Description of JP 09-045369 (Feb. 1997).*

(Continued)

*Primary Examiner* — Gregg Cantelmo
(74) *Attorney, Agent, or Firm* — BrooksGroup

(57) ABSTRACT

One embodiment includes a rechargeable charge storage device including a microcapsule disposed within said rechargeable charge storage device; and a thermal retardant chemical species contained within said microcapsule, wherein said microcapsule is adapted to release said chemical species upon being exposed to a triggering event either prior to or during an unstable rise in temperature of said charge storage device.

20 Claims, 4 Drawing Sheets

(56) References Cited

U.S. PATENT DOCUMENTS

| | | | |
|---|---|---|---|
| 5,879,834 | A | 3/1999 | Mao |
| 6,432,586 | B1 | 8/2002 | Zhang |
| 6,455,200 | B1 | 9/2002 | Prakash et al. |
| 6,720,007 | B2 | 4/2004 | Walt et al. |
| 7,026,074 | B2 | 4/2006 | Chen et al. |
| 7,108,914 | B2 * | 9/2006 | Skipor et al. ............. 428/402.21 |
| 8,309,240 | B1 * | 11/2012 | Li et al. ............................ 429/57 |
| 2004/0086782 | A1 | 5/2004 | Zhang et al. |
| 2004/0091772 | A1 * | 5/2004 | Ravdel et al. ................. 429/188 |
| 2005/0221197 | A1 | 10/2005 | Yew et al. |
| 2006/0000569 | A1 | 1/2006 | Kron et al. |
| 2007/0015048 | A1 * | 1/2007 | Lee et al. ..................... 429/118 |

OTHER PUBLICATIONS

IPDL Machine Translation of the Detailed Description of JP 10-270084 (Oct. 1998).*

Jun-Ichi Kadokawa, Yasuhiro Iwasaki, Hideyukki Tagaya; Ring-Opening Polymerization of Ethylene Carbonate Catalyzed with Ionic Liquids: Imidazolium Chloroaluminate and Chlorostannate Melts; Macromo, Rapid Communications, 2002,vol. 23 , No. 13, pp. 757-760.

Jong-Chan Lee, Morton H. Litt ; Ring-Opening Polymerization of Ethylene Carbonate and Depolymerization of Poly(ethylene oxide-co-ethyene carbonate); Macromolecules 2000,vol. 33,No. 5, 1618-1627; copyright 2000 American Chemical Society.

Y.E. Hyung et al. ,Journal of Power Sources ,"Flame-retardant additives for lithium-ion batteries" (2003); pp. 383-387.

William J. Schell , Zhengming Zhang ,Celgard Separators for Lithium Batteries , 0-7803-4967-9/99 ; IEEE, copyright 1999, pp. 161-169.

Barthel , http://arxiv.org/ftp/cond-mat/papers/0703/0703616.pdf, 15 pages; Adhesive contact of a compliant sphere to an elastic coated substrate: the thin film limit.

* cited by examiner

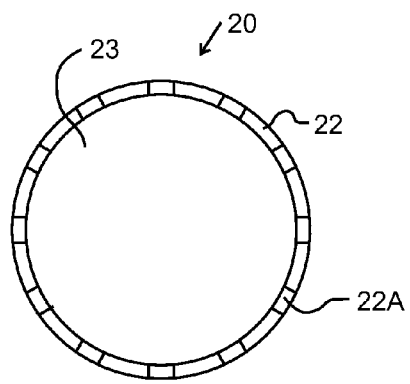
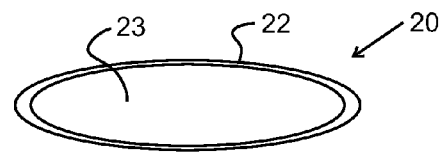
FIG. 2A
FIG. 2B
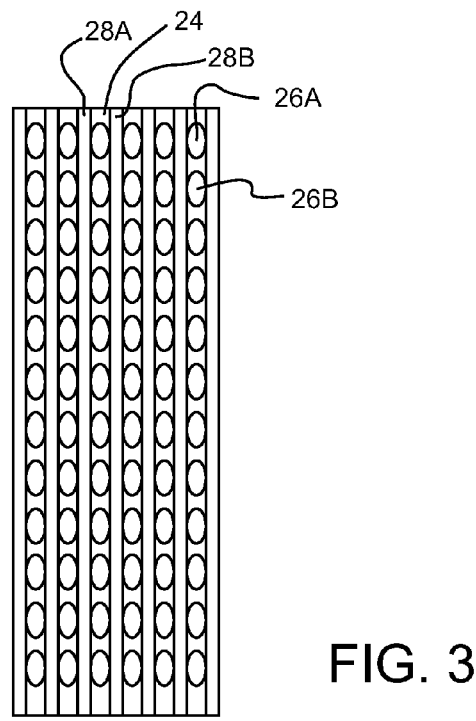
FIG. 3

MATERIALS AND METHODS FOR RETARDING OR PREVENTING THERMAL RUNAWAY IN BATTERIES

TECHNICAL FIELD

The field to which the disclosure relates to charge storage devices including batteries and methods for retarding or preventing thermal events such as thermal run-away.

BACKGROUND

Many potentially useful thermal event chemical retardants in the prior art may interfere with the electrochemical processes that control the primary function of the battery.

One approach in the prior art to preventing a highly localized current condition (HLCC) that can lead to thermal runaway has involved use of electrolyte additives that electrochemically polymerize under HLCC conditions. The polymerization reaction shuts down (closes off) the pores of the battery separator (stops transport of ions), increasing electrical resistance, and thereby prevents further passage of high currents or further localized heat generation contributions conditions.

SUMMARY OF SELECT ILLUSTRATIVE EMBODIMENTS OF THE INVENTION

One embodiment includes rechargeable charge storage device comprising an event triggerable material for retarding or preventing thermal runaway of the rechargeable charge storage device.

Another embodiment includes a rechargeable storage device including a plurality of thermally expandable hollow polymer microspheres including a core material in the sphere having a low boiling point so that upon heating the shell softens and the core material expands sufficient to retard or prevent thermal runaway of the rechargeable storage device. Another embodiment of the invention includes thermally expandable microspheres including low weight particle fillers including a propellant trapped within the microsphere and constructed and arranged so that the microsphere expands in diameter and/or changes the aspect ratio upon heating sufficient to prevent or retard thermal runaway of a rechargeable charge storage device in which the microspheres are disposed.

Another embodiment of the invention includes the incorporation of a shape memory polymer comprising a low density, thermal expandable inorganic filler constructed and arranged to self-expand upon a sudden rise in temperature. Another embodiment of the invention includes shape memory polymers filled with electrically insulating thermal expandable fillers. In one embodiment, the shape memory polymers including electrically insulating thermal expandable fillers may be included in a rechargeable charge storage device for retarding or preventing thermal runaway of the rechargeable charge storage device.

One exemplary embodiment includes a rechargeable charge storage device including a material for retarding or preventing thermal runaway disposed within said rechargeable charge storage device.

One embodiment includes a thermal retardant chemical species contained within said microcapsule, wherein said microcapsule is adapted to release said chemical species upon being exposed to a triggering event either prior to or during an unstable rise in temperature of said charge storage device.

Another embodiment includes a method of avoiding or preventing a thermal runaway in a rechargeable charge storage device, the method including providing a microcapsule disposed within said charge storage device; wherein said microcapsule contains a thermal retardant chemical species within said microcapsule; and releasing said chemical species from said microcapsule upon being exposed to a triggering event either prior to or during an unstable rise in temperature of said charge storage device.

Other embodiments will become apparent from the detailed description provided hereinafter. It should be understood that the detailed description and specific examples, while disclosing exemplary embodiments, are intended for purposes of illustration only and are not intended to limit the scope of the invention.

BRIEF DESCRIPTION OF THE DRAWINGS

The following description of the embodiment(s) is merely exemplary (illustrative) in nature and is in no way intended to limit the invention, its application, or uses.

FIGS. 2A and 2B are schematic views of microcapsules according to one embodiment.

FIG. 3, is a schematic view of microcapsules between separators within batteries, supercapacitors, or other electrochemical energy storage devices that employ separators according to one embodiment.

DETAILED DESCRIPTION OF EXEMPLARY EMBODIMENTS

Figure 1A:
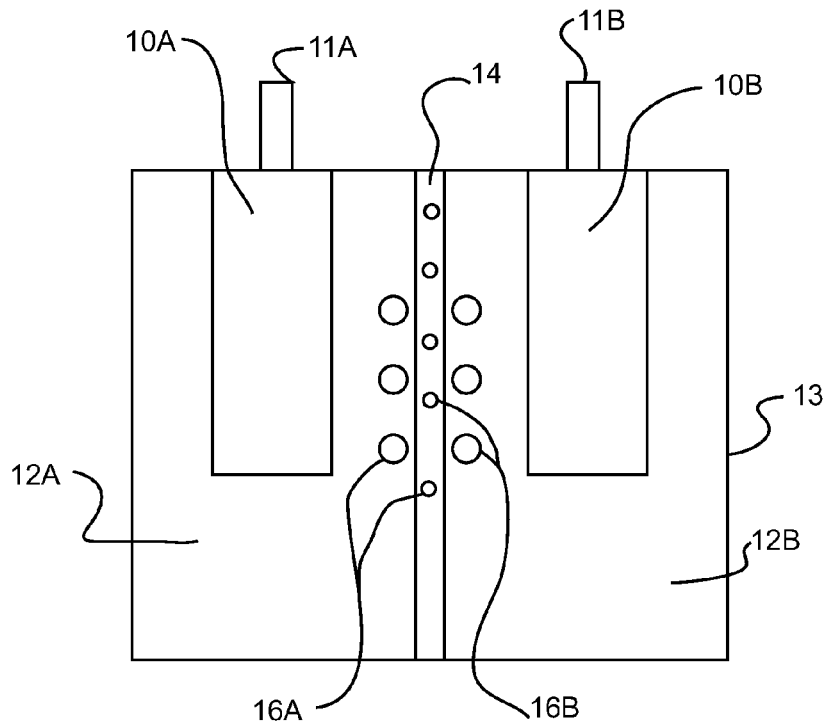
FIG. 1A is a schematic view of an exemplary lithium ion battery in accordance with an illustrative embodiment.

The following description of the embodiment(s) is merely exemplary (illustrative) in nature and is in no way intended to limit the invention, its application, or uses.

One embodiment of the invention includes rechargeable charge storage device comprising an event triggerable material for retarding or preventing thermal runaway of the rechargeable charge storage device. The material remaining inactive or in a first state but is triggered by an event such as a sudden rise in temperature or an a rapid increase in current density to become active or is transformed to a second state that results in retarding or preventing a potential thermal runaway condition during operation of the rechargeable charge storage device.

Another embodiment includes a rechargeable storage device including a plurality of thermally expandable hollow polymer microspheres including a core material in the sphere having a low boiling point so that upon heating, the shell softens and the core material expands, increasing pressure sufficient to retard or prevent thermal runaway of the rechargeable storage device. In one embodiment, the low boiling point core comprises a paraffin material. Another embodiment includes the thermally expandable microspheres which increase in diameter upon heating sufficient to retard or prevent thermal runaway of a rechargeable storage device in which they are disposed. In one embodiment, the thermally expandable microspheres are hollow. In one embodiment, the thermally expandable microspheres are included in a separator material between electrodes of the rechargeable storage device.

Another embodiment of the invention includes thermally expandable microspheres including low weight particle fillers including a propellant trapped within the microsphere and constructed and arranged so that the microsphere expands in diameter upon heating sufficient to prevent or retard thermal runaway of a rechargeable charge storage device in which the microspheres are disposed.

Another embodiment of the invention includes the incorporation of a shape memory polymer 51 comprising a low density, thermal expandable inorganic filler 57 constructed and arranged to self-expand upon a sudden rise in temperature. In select illustrative embodiments of suitable thermal expandable inorganic fillers include perlite, bohmite (AlO(OH)), hydrated alumina, clay or vermiculite.

Another embodiment of the invention includes shape memory polymers filled with electrically insulating thermal expandable fillers. In one embodiment, the shape memory polymers including electrically insulating thermal expandable fillers may be included in a rechargeable charge storage device for retarding or preventing thermal runaway of the rechargeable charge storage device. One embodiment includes cross-linked porous polyolefin shape memory polymers and expandable non-conductive fillers. Another embodiment of the invention includes a rechargeable charge storage device including separator materials constructed and arranged to change their volume when a certain temperature is reached in order to separate the electrodes of the storage device, making it more difficult for an uncontrolled reaction or thermal runaway of the storage device. Illustrative examples of select embodiments of materials for incorporation in the storage device separators include electroactive polymers constructed and arranged to change shape and increase volume upon exposure to relatively high current density; blowing agents that remain inactive until a specific temperature is reached, thereby becoming active and increasing the volume of the separator; and thermally expandable polypropylene/polystyrene materials blown with low vapor pressure solvents such as pentane, Freon incorporated in the separator; and intumescent materials constructed and arranged to expand when temperatures spike during the operation of a charge device sufficient to retard or prevent thermal runaway of the storage device. In one embodiment, the blowing agent or foaming agent may include diazoaminobenzene or celogneOT, for example (p,p'-oxybis(benzenesulfonylhydrazide)). In one embodiment, an intumescent additive such as ammonium polyphosphate may be added to the separator material.

In an exemplary embodiment one or more thermal event retardant chemical species are sequestered (encapsulated) in microcapsules and placed within an electrochemical energy storage device, or charge storage device, (e.g., battery or supercapacitor) where they may remain benign (inactive) and do not interfere with the chemistry of the operation of the battery. Upon the occurrence of a triggering event, such as the presence of a second chemical species external to the microcapsule before or during the thermal event, and/or a rise in temperature above a predetermined threshold indicating a thermal event, one or more of the microcapsules may release (e.g., by opening or increasing pore size) the one or more thermal event retardants to retard (e.g., slow or quench) the thermal event including neutralizing undesirable consequences of the thermal event such as quenching combustion (e.g., flames).

In one embodiment, the thermal event may be thermal run-away which may be an unstable thermal event feedback loop where higher temperatures result in faster electrochemical reactions that lead to further higher temperatures that may lead to an unstable and uncontrolled rise in temperature including combustion of battery components.

In other embodiments, microcapsules including one or more chemical retardants (species) may be configured to slowly release the one or more chemical retardants such that the concentration of the chemical retardant is at a sufficiently low concentration so as to not interfere with operation of the battery, yet which becomes active upon the occurrence of a thermal event.

In other embodiments, a temperature increase above a first threshold temperature may cause the presence or release of low concentrations of a first chemical species which may further trigger a quick and full release of the encapsulated one or more chemical retardants, e.g., act to at least partially open a microcapsule above a second threshold temperature.

In some embodiments, the amount of the one or more chemical retardants released before or during the thermal event is selected so that only a targeted area or portion of the battery is affected or neutralized, which may include partial inoperability, while maintaining at least some operability of the battery in order to provide limited power or functionality for a period of time to allow the operators to take further action to obtain service (e.g., transportation to a service station).

In some embodiments, the charge storage device may be any type of rechargeable battery known in the art. In some embodiments, the rechargeable battery may include a liquid electrolyte and/or liquid electrode material. In other embodiments, the electrolyte may be a gel or solid electrolyte. In one embodiment, the battery may be a lithium-ion battery.

In some embodiments, the charge storage device may be a rechargeable vehicle battery or supercapacitor for at least partially powering an electric or hybrid vehicle.

In some embodiments, the rechargeable battery may include liquid electrode and/or liquid electrolyte material which may include any known salts of lithium such as one or more of $LiPF_6$, $LiBF_4$, and $LiClO_4$.

In some embodiments, the rechargeable battery may include a separator formed of a polymer material. In one embodiment, the separator polymer material may include one or more saturated hydrocarbons such as polyethylene and polypropylene. In one embodiment, the separator may be filled with a solvent material. In another embodiment, the solvent material may be a carbonate such as ethylene carbonate and diethyl carbonate.

In some embodiments the rechargeable battery may include solid electrolyte material or gel electrolyte material which may include any material known in the art including polymer composites e.g., including polymers such as polyethyleneoxide (PEO) or polyacrylonitrile and lithium salts such as one or more of LiPF6, LiBF4, and LiClO4, as well as fillers.

In one embodiment, the microcapsules containing one or more chemical retardants (species) may be included within the electrolyte (e.g., liquid or gel) of the battery. In other embodiments, the microcapsules containing one or more chemical retardants may be included within one or more of the electrodes (e.g., liquid or gel) of the battery.

For example, referring to FIG. 1A is shown a schematic of an exemplary thin film lithium ion battery cell having a solid state positive electrode (the cathode on discharge) 10A which may be adjacent a separator 14 which may be a porous or stretched woven polymer (e.g., propylene and ethylene) containing a liquid electrolyte 12A (e.g., hydrocarbon solution of lithium salt e.g., $LiPF_6$) and which may also be adjacent a solid state negative electrode (the anode on discharge) 10B containing a liquid electrolyte 12B. The electrodes may include a metal current collector e.g., 11A, 11B onto which host electrode materials (e.g., metal oxide cathode and graphite anode) are respectively attached. For example, the host electrode materials may be porous material layers of about 100 microns in thickness and including particles of 1 to about 5 microns in diameter e.g., held together by a conductive binder. The separator 14 may have a thickness less than the electrode thickness e.g., about 25 microns. The microcapsules, e.g., 16 containing one or more chemical retardants may be included anywhere within the battery cell and in one embodiment between the electrodes, e.g., within or separate from the separator 14 and in one embodiment, may assist in maintaining a separation distance between the respective electrodes 10A, 10B.

Figure 1B:
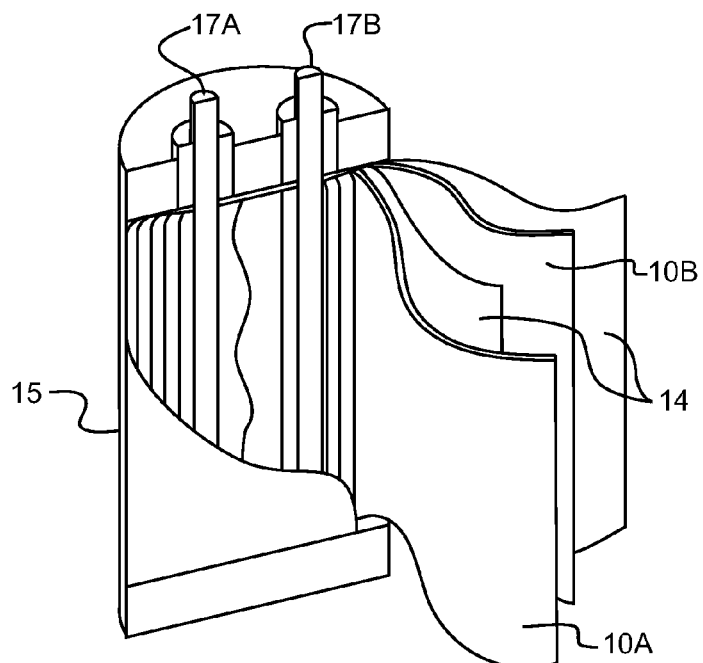
FIG. 1B is a schematic view of one illustrative embodiment of lithium ion battery having long single negative and positive electrodes wrapped around a mandrel to form the cell.

Referring to FIG. 1B, it will be appreciated that in some embodiments, a lithium ion battery having long single negative and positive electrodes wrapped around a mandrel to form the cell e.g., 10A and 10B, separated by respective separators e.g., 14 and may be housed in a laminated film case 15. Positive and negative terminals e.g., 17A, 17B may be provided extending outside the laminated film case as is known in the art.

In some embodiments, the one or more chemical retardants may be soluble in the electrolyte and/or electrode. In other embodiments the one or more chemical retardants may include organic phosphorous-containing compounds.

In other embodiments, the one or more chemical retardants may be insoluble in the electrolyte and/or electrode and/or chemically incompatible with operation of the battery. In some embodiments the one or more chemical retardants may include one or more of metal hydroxides, halogenated compounds, and synergists such as antimony trioxide.

In other embodiments, the one or more chemical retardants may include polymerizing additives that may cause polymerization of liquid electrode and/or electrolyte material above a threshold temperature e.g., prior to or during thermal runaway conditions. In one embodiment, the one or more chemical retardants may include one or more of furans and thioacetic acid S-phenyl ester.

In other embodiments, the one or more chemical retardants may include polymerizing additives that cause polymerization of liquid electrode and/or electrolyte material, and are released from the microcapsules upon triggering by a thermal event. The one or more chemical retardants may retard (slow and/or stop) the thermal event such as by retarding normal electrochemical operation of only a targeted area or portion of the battery, e.g., increasing the internal resistance of the battery by closing up the pores in a separator (polymerization clogs pores) and/or retard the effects of a thermal event (e.g., quench flames). This action and result could act on the whole battery as well.

For example, in some embodiments, upon the release of one or more chemical retardants that cause a polymerization reaction, e.g., the chemical retardant may be a monomer, pre-polymer or the like, such as but not limited to isocynates. A corresponding foaming action may occur that creates an expanding void that has the effect of quenching flames or other associated consequences of a thermal run-away event.

In other embodiments, the one or more chemical retardants may include Lewis acids or bases that may act to cause polymerization reactions in non-aqueous liquid electrolyte solvents such organic cyclic containing carbonates including ethylene and/or propylene carbonate containing solvents. For example, when exposed to Lewis acids or bases under moderate increases in temperature cyclic carbonates may undergo a ring-opening polymerization reaction. In addition, release of $CO_2$ may accompany such polymerization further adding to the thermal retardant effect (e.g., flame quenching) of the released chemical retardant. In some embodiments, it will be appreciated that the Lewis acid or base component, when encapsulated within a microcapsule, may remain inactive until released from the microcapsule upon triggering by a chemical and/or thermal event.

Referring to FIGS. 2A and 2B, in some embodiments, the microcapsules e.g., 20 may be hollow, including an outer shell 22, formed of a polymer, and a hollow core 23. In one embodiment, the outer shell thickness 22 and/or hollow core 23 dimensions of the microcapsules may be controlled to control out-diffusion of the one or more chemical retardants contained within the core, e.g., substantially prevent out-diffusion or allow out-diffusion at a relatively slow controlled rate over time. In another embodiment, additionally or alternatively to controlling a shell thickness, the microcapsule shells may have mono-sized and/or multi-sized pores e.g., 22A to control out-diffusion of the one or more chemical retardants. For example, as explained below, in some embodiments, the size of the pores may be increased upon a triggering event such as a rise in temperature above a threshold temperature. Referring to FIG. 2B, in some embodiments, the microcapsules need not be spherical as depicted in FIG. 2A, but may be semispherical, asymmetric, or oblong in shape. In other embodiment, the microcapsules may be polygonal in shape.

In some embodiments, the properties of the shell and/or pores may be engineered to change upon exposure to a triggering event, such as a temperature threshold, or the presence of external chemicals indicating an electrochemically driven thermal event is or is about to occur within the battery. For example, in one embodiment, the size of the pores may increase upon a temperature rising above a threshold, thereby allow a relatively quick release of the one or more chemical retardants above the temperature threshold while substantially preventing out diffusion below a temperature threshold.

In other embodiments, the polymer type of the shell may be selected, e.g. provided with a predetermined glass transition temperature ($T_g$) and/or a shell thickness such that upon increase of a temperature above a threshold, the shell may partially or fully open and/or the pores may increase in size such that a relatively quick release of the one or more chemical retardants occurs.

In some embodiments, the hollow polymer microcapsules may have an outer diameter ranging from about 0.1 micron to about 1000 microns. In other embodiments, the hollow microcapsules may have a shell thickness ranging from about 1 nm to about 500 nm. In yet other embodiments, the hollow microcapsules may have a pore size in the shell ranging from about 1 nm to about 100 nm.

Referring to FIG. 3, in yet other embodiments, the outer diameter and shape of the microcapsules e.g., 26A, 26B, may be selected and positioned so that they may have the additional effect of maintaining a predetermined separation between components of a battery or supercapacitor such as battery electrodes 28A, 28B or separator layers 24 of supercapacitor separators.

In some embodiments, the one or more chemical retardants may be incorporated within the hollow polymer microcapsules by allowing the one or more chemical retardants to diffuse into the hollow core portion of the microcapsules. In one embodiment, the microcapsules may be initially formed with a relatively larger pore size (or an opening temporarily formed in the shell) to allow diffusion of the one or more chemical retardants into the hollow portion of the microcapsule, followed by subsequent further polymer cross-linking reactions (e.g., further radical polymerization by exposure to energy and/or chemicals initiating further polymer cross-linking) to narrow and/or close off the pores to seal the one or more chemical retardants within the microcapsule.

In other embodiments, the one or more chemical retardants may be incorporated within the hollow polymer microcapsules by injection with a micro-injector, following sealing of a temporarily created hole by further polymer cross-linking and/or partially melting microcapsule (e.g., above glass transition temperature $T_g$).

The hollow core microcapsules may be formed by a variety of processes and be formed from a variety of polymers. In some embodiments, the polymer microcapsules may be formed by surface confined living radical polymerization as outlined in U.S. Pat. No. 6,720,007, which is incorporated herein by reference. For example, in some embodiments, a solid template (core) e.g., silica microspheres may be used to graft polymer seeds onto the template and cause radical polymerization to form a polymer shell on the template followed by dissolving the template to leave a hollow core polymer microcapsule (e.g., microsphere).

In some embodiments, the hollow polymer microcapsule may include one or more of polymers resulting from the polymerization of one or more monomers selected from the group consisting of acrylonitrile, styrene, benzyl methacrylate, phenyl methacrylate, ethyl methacrylate, divinyl benzene, 2-hydroxyethyl methacrylate, cyclohexyl methacrylate, p-methyl styrene, acrylamide, methacrylamide, methacrylonitrile, hydroxypropyl methacrylate, methoxy styrene, N-acrylylglycinamide, and N-methacrylylglycinamide.

In other embodiments, additionally or alternatively, the hollow polymer microcapsule may include a co-polymer (random or block) selected from the group consisting of styrene-PMMA, benzyl methacrylate-PMMA, styrene-PHEMA, styrene-PEMA, styrene-methacrylate, and styrene-butylacrylate.

In some embodiments, the type of polymer cross-linking may be varied in amount and type to achieve a desired degree of mechanical and chemical robustness, e.g., for achieving a selected behavior at a selected temperature (e.g., a glass transitions temperature Tg). In one embodiment the type of polymer cross-linking (e.g., urethane vs. ester linkages) may be altered to achieve a desired behavior of the microcapsules (e.g., changing pore size and/or shell opening at a selected temperature. In other embodiments, the microcapsules may include polyolefin-graft-PEG (polyethylene glycol) copolymers, e.g., where the copolymer may be grafted onto microcapsule templates followed by radical polymerization.

Figure 4:
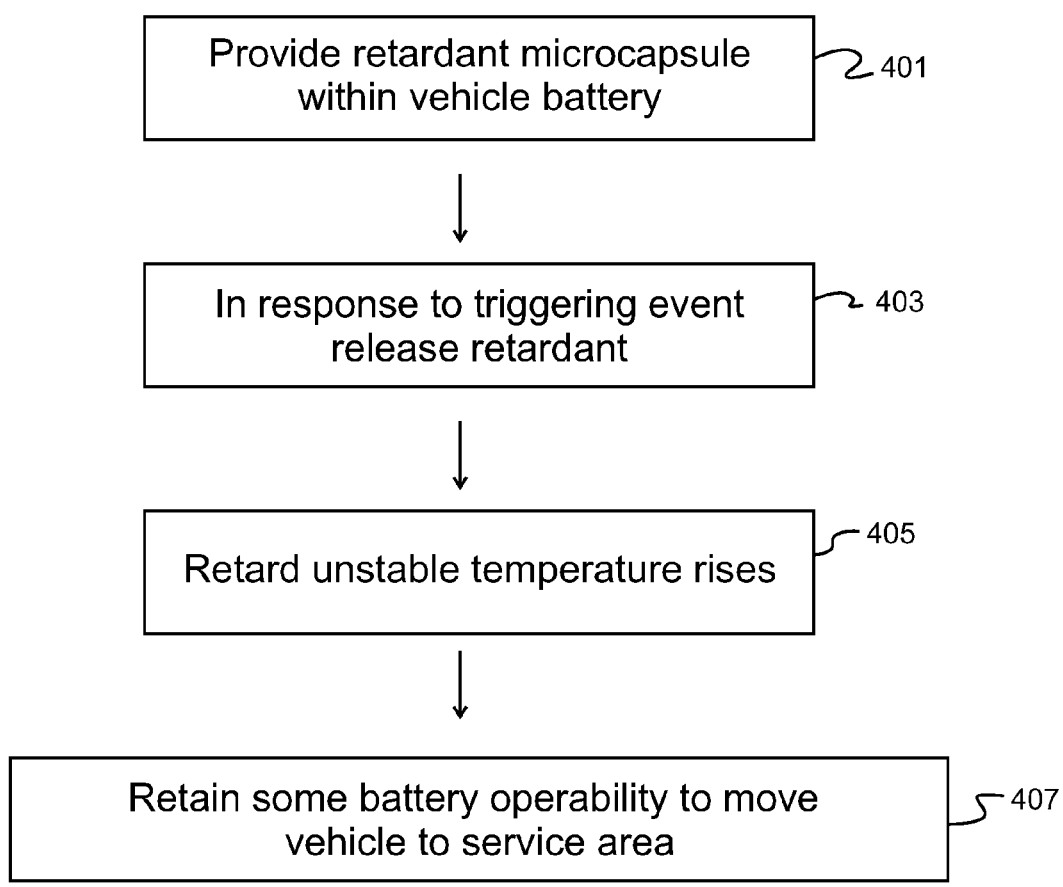
FIG. 4 illustrates a process flow diagram for retarding a thermal run-away event according to one embodiment.

Referring to FIG. 4, in an exemplary process flow of a method according to an exemplary embodiment. In step 401 a microcapsule containing a thermal event chemical retardant is provided within a vehicle battery. In step 403, a thermal and/or chemical trigger causes relatively quick release of the thermal event chemical retardant within the battery. In step 405, an undesirable temperature rise within the battery is retarded. In step 407, the battery may maintain some operability to move the vehicle to a vehicle service area.

Figure 5:
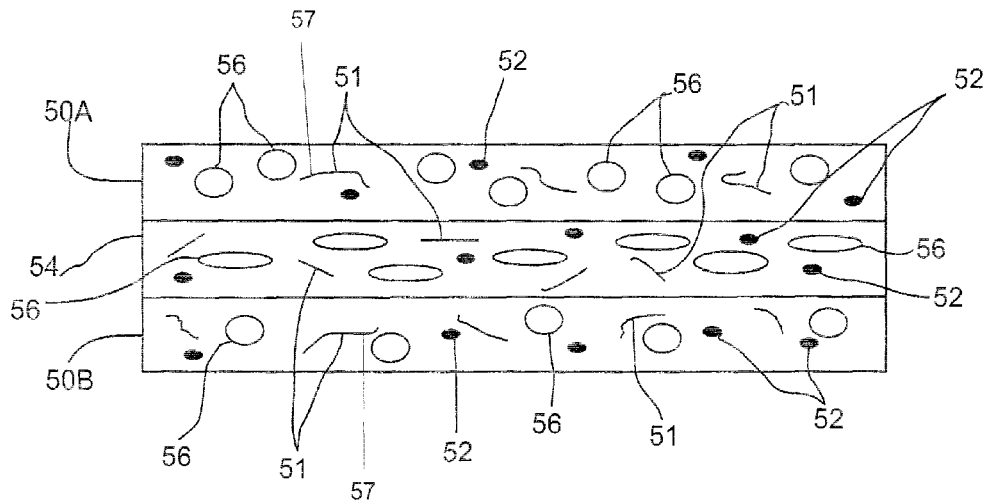
FIG. 5 is an illustration of a portion of a lithium ion battery including electrodes and a separator having fillers therein according to one embodiment.

Referring now to FIG. 5, one embodiment of the invention may include a rechargeable charge storage device including a positive electrode 50A and a negative electrode 50B with a separator 54 therebetween. Each of the positive electrode 50A, negative electrode 50B and/or separator 54 may include a plurality of different types of fillers including, but not limited to, microspheres 56 which may be solid or hollow and include any of the materials described in the embodiments above, shape memory polymers 51 or other fillers such as particles or agglomerations 52. The fillers 51, 52, 56 may be constructed and arranged to upon a triggering event become active or release materials or change shape to increase the distance between the positive electrode 50A and negative electrode 50B, and/or release or activate a chemical retardant and/or release or activate electrically insulating fillers to reduce current density in the cell. The fillers 51, 52 and 56 may be constructed and arranged such that upon a triggering event the distance between the positive electrode 50A and the negative electrode 50B is increased. This may be accomplished by increasing the volume or the thickness of the separator 54 so that in one embodiment the fillers 51, 52, 56 in the separator may expand, or by reducing the volume or thickness of one or more of the positive electrode 50A or negative electrode 50B so that in one embodiment the fillers 51, 52, 56 in at least one of the electrodes 50A, 50B shrinks, compresses or collapses or otherwise changes shape.

Figure 6:
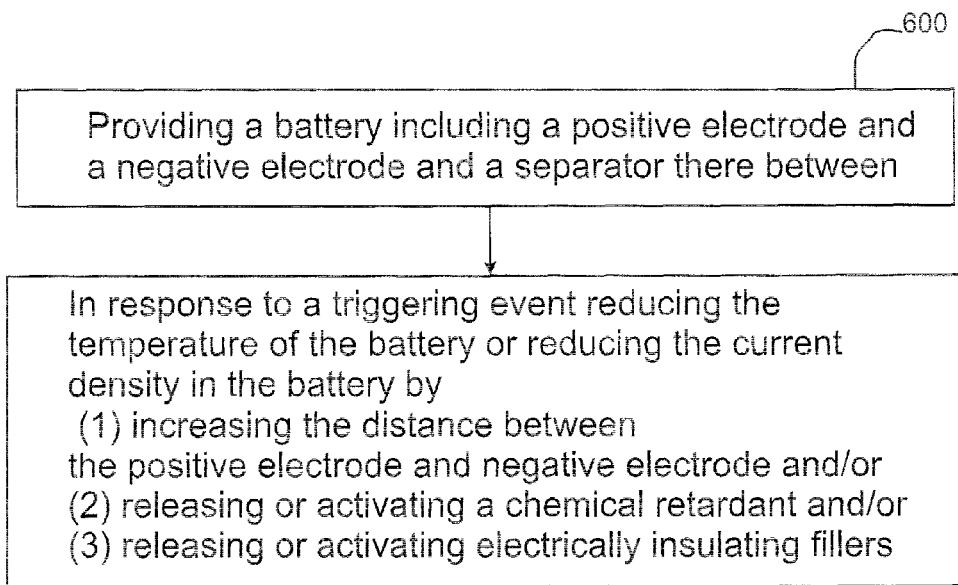
FIG. 6 is a flow diagram illustrating a process according to one embodiment.

Referring now to FIG. 6, in one embodiment, a method including providing a battery including a positive electrode and a negative electrode and a separator therebetween 600, and in response to a triggering event corrective action occurs (passively) reducing the temperature of the battery or reducing the current density in the battery by (1) increasing the distance between the positive electrode and negative electrode, and/or (2) releasing or activating a chemical retardant, and/or (3) releasing or activating electrically insulating fibers to reduce the current density in the battery 602

The above description of embodiments of the invention is merely exemplary in nature and, thus, variations thereof are not to be regarded as a departure from the spirit and scope of the invention.

What is claimed is:

1. A rechargeable charge storage device comprising:
   a microcapsule disposed within said rechargeable charge storage device;
   a thermal retardant chemical species contained within said microcapsule, wherein said microcapsule is adapted to release said chemical species upon being exposed to a triggering event either prior to or during an unstable rise in temperature of said charge storage device; and
   at least one shape memory polymer is disposed within said rechargeable charge storage device.

2. The device of claim 1, wherein said charge storage device comprises at least one of a vehicle battery or a vehicle supercapacitor.

3. The device of claim 1, wherein said charge storage device comprises a lithium-ion battery.

4. The device of claim 3, wherein said lithium-ion battery comprises a non-aqueous carbonate electrolyte.

5. The device of claim 4, wherein said carbonate comprises at least one of ethylene carbonate or polypropylene carbonate.

6. The device of claim 1, wherein said microcapsule is disposed within at least one of an electrolyte or an electrode comprising said charge storage device.

7. The device of claim 1, wherein said microcapsule is disposed adjacent at least one of a separator or an electrode comprising said charge storage device.

8. The device of claim 1, wherein said microcapsule is sandwiched between battery components comprising at least one of electrodes or separators to maintain a separation distance.

9. The device of claim 1, wherein said chemical species is selected from the group consisting of organic phosphorous containing compounds.

10. The device of claim 1, wherein said chemical species comprises at least one of metal hydroxides, halogenated compounds, or synergists.

11. The device of claim 1, wherein said chemical species comprises a polymerization initiator.

12. The device of claim 11, wherein said polymerization initiator comprising at least one of a furan, thioacetic acid S-phenyl ester, a Lewis acid, or a Lewis base.

13. The device of claim 1, wherein said microcapsule comprises a polymer shell and a core containing said chemical species.

14. The device of claim 13, wherein said polymer shell comprises pores communicating with said core.

15. The device of claim 1, wherein said triggering event comprises a threshold temperature.

16. The device of claim 1, wherein the shape memory polymer comprises a low density, thermal expandable inorganic filler constructed and arranged to self-expand upon a sudden rise in temperature.

17. The device of claim 1, wherein the shape memory polymer is filled with electrically insulating thermal expandable fillers.

18. The device of claim 1, wherein said microcapsule has an outer diameter of approximately 0.1 micron to approximately 1000 microns.

19. The device of claim 1, wherein said microcapsule has a shell thickness of approximately 1 nm to approximately 500 nm.

20. The device of claim 1, wherein the microcapsule has a pore size ranging from approximately 1 nm to approximately 100 nm.

\* \* \* \* \*